US007147262B2

(12) United States Patent
Guillez et al.

(10) Patent No.: US 7,147,262 B2
(45) Date of Patent: Dec. 12, 2006

(54) VEHICLE TRUNK HOOD

(75) Inventors: Jean-Marc Guillez, Cirieres (FR); Paul Queveau, Montravers (FR); Gererd Queveau, Le Pin (FR)

(73) Assignee: Societe Europeenne des Brevets Automobiles (FR)

( * ) Notice: Subject to any disclaimer, the term of this patent is extended or adjusted under 35 U.S.C. 154(b) by 83 days.

(21) Appl. No.: 10/500,379

(22) PCT Filed: Dec. 31, 2002

(86) PCT No.: PCT/FR02/04592

§ 371 (c)(1),
(2), (4) Date: Mar. 18, 2005

(87) PCT Pub. No.: WO03/060271

PCT Pub. Date: Jul. 24, 2003

(65) Prior Publication Data

US 2005/0168005 A1 Aug. 4, 2005

(30) Foreign Application Priority Data

Jan. 4, 2002 (FR) .................................. 02 00105

(51) Int. Cl.
*B62D 25/10* (2006.01)

(52) U.S. Cl. ...................................... 296/76; 296/37.16

(58) Field of Classification Search .................. 296/76, 296/100.1, 146.4; 49/26, 28
See application file for complete search history.

(56) References Cited

U.S. PATENT DOCUMENTS

| | | | | |
|---|---|---|---|---|
| 3,011,818 | A * | 12/1961 | Matthiessen | 296/76 |
| 4,139,231 | A * | 2/1979 | Lang et al. | 296/76 |
| 4,222,601 | A * | 9/1980 | White et al. | 296/37.16 |
| 4,671,557 | A * | 6/1987 | Lemp | 296/37.16 |
| 4,823,059 | A * | 4/1989 | Compeau et al. | 296/76 |
| 5,072,985 | A * | 12/1991 | Yanagimoto et al. | 296/76 |
| 5,320,398 | A * | 6/1994 | Popp et al. | 296/76 |
| 5,944,376 | A * | 8/1999 | Buchanan, Jr. | 296/146.4 |
| 6,454,339 | B1 * | 9/2002 | Wilde et al. | 296/76 |
| 6,575,517 | B1 * | 6/2003 | Yamagishi et al. | 296/76 |
| 2004/0205934 | A1 * | 10/2004 | Derbis et al. | 16/289 |

* cited by examiner

*Primary Examiner*—Kiran B. Patel
(74) *Attorney, Agent, or Firm*—Bachman & LaPointe

(57) ABSTRACT

A trunk hood designed to be automatically closed in controlled manner and to cover the trunk in closed position, comprises an inner surface. The hood comprises an inner mat integral with the inner surface, at least one deformable linking means for linking the inner mat to the inner surface mobile between a spaced apart position and a close-up position, and at least one contact switch designed to detect a close-up position of the inner mat relative to the inner surface and to interrupt the movement closing the hood.

7 Claims, 1 Drawing Sheet

VEHICLE TRUNK HOOD

BACKGROUND OF THE INVENTION

This invention relates to a hood for a motor vehicle trunk, particularly a hood for a luggage compartment, for example the trunk compartment at the back of the vehicle.

Luggage placed in the trunk of a vehicle can hinder closing of the hood.

When the trunk is closed manually, the operator observes this hindrance and acts accordingly, particularly by moving the offending luggage.

When the trunk is closed automatically following an order given by an operator, the operator might not notice the hindrance, but continuation of the closing movement can damage the luggage or the closing mechanism.

Some trunks are equipped with curtains that protect luggage to prevent this problem and the operator then pulls the curtain tight to check that the luggage is actually within the space delimited by the curtain. This type of solution requires that the operator should do something and requires special equipment.

SUMMARY OF THE INVENTION

The purpose of the invention is to make a device that prevents continuation of the closing movement of an automatic closure trunk as soon as any luggage hinders this closing.

According to the invention, a trunk hood designed to close automatically after an order and to cover the trunk in the closed position and comprising an inner surface, comprises an inner mat fixed to the inner surface of the hood, at least one deformable linking means for linking the inner mat to the inner surface while remaining free to move between a remote position and a close position, and at least one contact switch designed to detect a close position of the inner mat relative to the inner surface and controlling interruption of the hood closing movement.

Thus, as soon as luggage hinders closing of the hood, it comes into contact with the inner mat and brings it towards the inner surface of the hood, which activates the contact switch and interrupts the closing movement. In this way, neither the luggage nor the closing mechanism is damaged. The operator is informed of the interruption in closing and can control and correct the arrangement of the luggage.

The expression "inner surface" should be understood in the broad sense, including the lower surface of a structure consisting of several layers, as illustrated in FIG. 2.

Other special features of this invention will become clear after reading the following description.

BRIEF DESCRIPTION OF THE DRAWINGS

In the appended drawings, given as non-limitative examples.

DETAILED DESCRIPTION OF THE PREFERRED EMBODIMENT(S)

Figure 1:
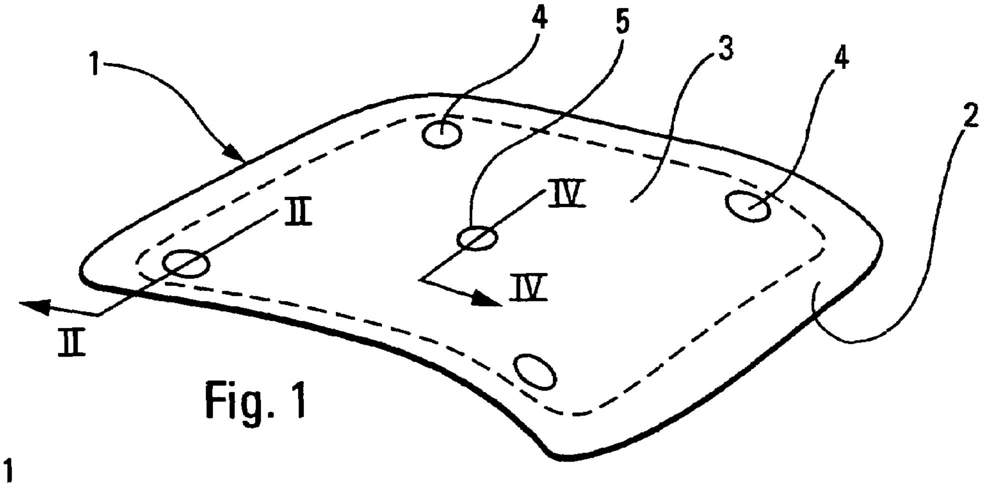
FIG. 1 shows a diagrammatic perspective view of a trunk hood according to this invention.
Figure 2:
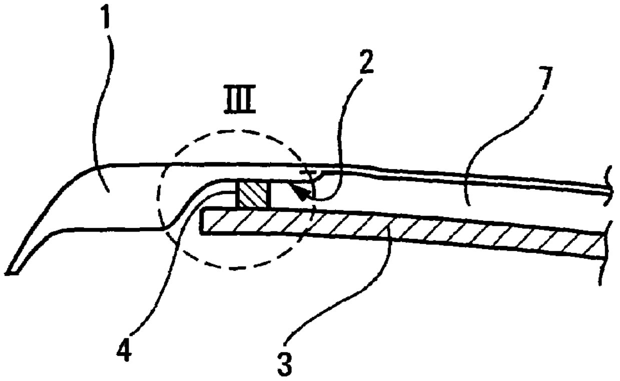
FIG. 2 shows a partial sectional view of the hood along line II—II in FIG. 1 passing through a deformable linking means.

A vehicle luggage compartment hood 1 is articulated so that it can be free to move between an open position in which the trunk is accessible from the outside and in which its contents can be loaded or unloaded, and a closed position in which the trunk is no longer accessible.

The hood 1 comprises an inner surface 2 that faces the trunk when the hood 1 is in the closed position and covers the trunk opening.

According to this invention, the hood 1 comprises an inner mat 3 that is fixed to the inner surface 2. The inner mat 3 follows the general movement of the hood 1. The inner mat 3 is located inside the trunk when the hood 1 is in the closed position and it extends approximately over its entire surface defined by the opening of the trunk such that any luggage placed inside the trunk and that could hinder closing of the hood 1 can come into contact with it.

According to this invention, the hood 1 also comprises at least one deformable linking means 4 for linking the inner mat 3 to the inner surface 2 while remaining free to move. Each deformable linking means 4 enables the inner mat 3 to follow the general closing and opening movement followed by the hood 1, while enabling the inner mat 3 to move with respect to the inner surface 2 of the hood 1 between a normal position remote from the inner surface 2 and a position close to the inner surface 2 when the inner mat 3 comes into contact with luggage when the hood 1 is closed.

According to the invention, the hood 1 also comprises at least one contact switch 5 that can detect a near position of the inner mat 3 with respect to the inner surface 2 of the hood 1 and can consequently control interruption of the hood 1 closing movement.

If luggage 6 located in the trunk hinders the closing movement when the hood 1 is being closed, it will come into contact with the inner mat 3. The deformable linking means 4 enable the inner mat 3 to come closer to the inner surface 2 of the hood 1 until the inner mat 3 reaches a close position which activates the contact switch 5 and interrupts the closing movement of the hood 1. In this way, neither the luggage nor the closing mechanism is damaged. The operator is informed that closing has been interrupted and can control and correct the arrangement of the luggage.

In the embodiment illustrated in FIGS. 1 to 4, the hood 1 is provided with four deformable linking means 4, each of these deformable linking means 4 being located close to a corresponding corner of the hood 1, in the space 7 between the inner surface 2 and the inner mat 3. The hood 1 is also equipped with a contact switch 5 placed approximately at its centre and also between the inner surface 2 and the inner mat 3.

Figure 3:
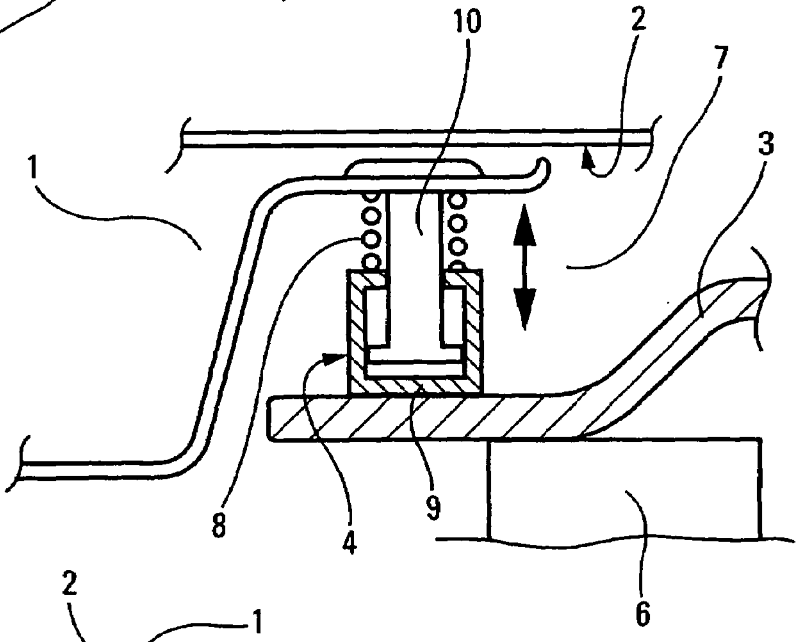
FIG. 3 shows an enlarged view of zone III in FIG. 2.

In the embodiment illustrated in FIG. 3, the deformable linking means 4 comprises an elastic device 8 that permanently pulls the inner mat 3 towards its position away from the inner surface 2.

The deformable linking means 4 comprises a guide 9 fixed to the inner mat 3 and an element 10 fixed to the inner surface 2. The element 10 is free to move in translation with respect to the guide 9 between an extended position in which the inner mat 3 is in its position remote from the inner surface 2 and a retracted position in which the inner mat 3 is in its position close to the inner surface 2.

The elastic device 8, that is a compression spring, is fixed firstly to the guide 9 and secondly to the inner surface 2, and continuously applies a load from the mobile element 10 pulling it towards its extended position.

In the example illustrated in FIG. 3, luggage 6 hinders closing of the hood 1 and firstly brings the inner mat 3 into a close position, and secondly brings the mobile element 10 to its retracted position.

Figure 4:
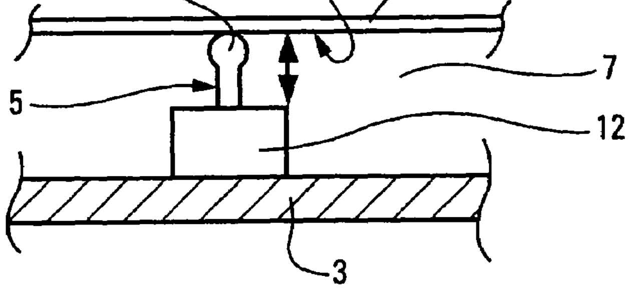
FIG. 4 shows a partial sectional view of the hood along line IV—IV in FIG. 1 passing through a contact switch.

As can be seen in FIG. 4, the contact switch 5 may include a rod 11 forming a switch, free to move with respect to a housing 12 that is connected to any known automatic closing device for closing the hood 1. The movement of the rod 11 with respect to the housing 12 is provoked by a movement of the inner mat 3 with respect to the inner surface 2.

Obviously, this invention is not limited to the embodiments that have just been described, and many changes and modifications could be added to them without going outside the scope of the invention.

For example, when the contact switch 5 is activated, it can control not only an interruption to automatic closing of hood 1, but also automatic opening.

Other embodiments of the deformable linking means 4 are possible, for example the guide 9 can be fixed to the inner surface 2 of the hood 1 and the mobile element 10 can be fixed to the inner mat 3.

Other types of contact switches 5 could also be suitable.

The inner mat 3 can also be fixed to the inner surface 2 by three deformable linking means 4.

The invention claimed is:

1. A motor vehicle trunk hood designed to close automatically after an order and to cover a trunk in a closed position and comprising an inner surface, an inner mat fixed to the inner surface, at least one deformable linking means for linking the inner mat to the inner surface while remaining free to move between a remote position and a close position, and at least one contact switch for detecting said close position of the inner mat relative to the inner surface and for controlling interruption of the closing movement of the hood.

2. A motor vehicle trunk hood according to claim 1, wherein the inner mat extends approximately over an entire surface defined by an opening of the trunk.

3. A motor vehicle trunk hood according to claim 1, further comprising four deformable linking means, each located close to a corresponding corner of the hood, and said at least one contact switch being placed approximately at a center of the head.

4. A motor vehicle trunk hood according to claim 1, wherein each said deformable linking means is located between the inner surface and the inner mat.

5. A motor vehicle trunk hood according to claim 1, wherein each said contact switch is located between the inner surface and the inner mat.

6. A motor vehicle trunk hood according to claim 1, wherein each said deformable linking means comprises an elastic device that permanently pulls the inner mat in a remote position from the inner surface.

7. A motor vehicle trunk hood according to claim 1, wherein each said deformable linking means comprises a guide fixed to either the inner surface or the inner mat and an element fixed to the other of the inner surface and the inner mat, and said element being free to move in translation with respect to the guide between an extended position in which the inner mat is in a position remote from the inner surface and a retracted position in which the inner mat is in a position close to the inner surface.

* * * * *